US012803782B2

(12) United States Patent
Lu et al.

(10) Patent No.: US 12,803,782 B2

(45) Date of Patent: Nov. 17, 2026

(54) HOMOMORPHIC ENCRYPTION OPERATION METHOD AND APPARATUS, AND ELECTRONIC DEVICE

(71) Applicant: Alipay (Hangzhou) Information Technology Co., Ltd., Hangzhou (CN)

(72) Inventors: Yufei Lu, Hangzhou (CN); Chaofan Yu, Hangzhou (CN); Lei Wang, Hangzhou (CN); Benyu Zhang, Palo Alto, CA (US); Jingren Zhou, Bellevue, WA (US)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 79 days.

(21) Appl. No.: 18/857,120

(22) PCT Filed: Apr. 10, 2023

(86) PCT No.: PCT/CN2023/087309

§ 371 (c)(1),
(2) Date: Oct. 15, 2024

(87) PCT Pub. No.: WO2023/197995

PCT Pub. Date: Oct. 19, 2023

(65) Prior Publication Data

US 2025/0254021 A1 Aug. 7, 2025

(30) Foreign Application Priority Data

Apr. 15, 2022 (CN) ......................... 202210397418.5

(51) Int. Cl.
*H04L 9/00* (2022.01)
*H04L 9/08* (2006.01)

(52) U.S. Cl.
CPC ............ *H04L 9/008* (2013.01); *H04L 9/0825* (2013.01)

(58) Field of Classification Search
CPC .............................. H04L 9/008; H04L 9/0825
(Continued)

(56) References Cited

U.S. PATENT DOCUMENTS 8,130,947 B2 * 3/2012 Kerschbaum ...... G06Q 20/3674 713/168
10,511,434 B2 12/2019 Jost et al.
(Continued)

FOREIGN PATENT DOCUMENTS

CN 107852324 A 3/2018
CN 114124349 A 3/2022
(Continued)

OTHER PUBLICATIONS

"International Search Report" regarding Intl. Application No. PCT/CN2023/087309, mailed on Jul. 31, 2023, pp. 1-9.
(Continued)

*Primary Examiner* — Chau Le
*Assistant Examiner* — Phuc Pham

(57) ABSTRACT

Provided in the embodiments of the present description are a homomorphic encryption operation method and apparatus, and an electronic device. The homomorphic encryption operation method comprises: determining a homomorphic encryption operation which is to be executed on specified service data, and obtaining a base parameter and an exponent parameter of an exponentiation operation included in the homomorphic encryption operation; according to the exponent parameter, querying an exponentiation operation result cache table corresponding to the base parameter so as to obtain a result of the exponentiation operation; and according to the result of the exponentiation operation, completing the homomorphic encryption operation.

17 Claims, 7 Drawing Sheets

14.76 Algorithm Right-to-left binary exponentiation

INPUT: an element $g \in G$ and integer $e \geq 1$.
OUTPUT: $g^e$.

1. $A \leftarrow 1$, $S \leftarrow g$.
2. While $e \neq 0$ do the following:
   2.1 If $e$ is odd then $A \leftarrow A \cdot S$.
   2.2 $e \leftarrow \lfloor e/2 \rfloor$.
   2.3 If $e \neq 0$ then $S \leftarrow S \cdot S$.
3. Return($A$).

14.77 Example (*right-to-left binary exponentiation*) The following table displays the values of $A$, $e$, and $S$ during each iteration of Algorithm 14.76 for computing $g^{283}$. □

| | | | | | | | | | | |
|---|---|---|---|---|---|---|---|---|---|---|
| $A$ | 1 | $g$ | $g^3$ | $g^3$ | $g^{11}$ | $g^{27}$ | $g^{27}$ | $g^{27}$ | $g^{27}$ | $g^{283}$ |
| $e$ | 283 | 141 | 70 | 35 | 17 | 8 | 4 | 2 | 1 | 0 |
| $S$ | $g$ | $g^2$ | $g^4$ | $g^8$ | $g^{16}$ | $g^{32}$ | $g^{64}$ | $g^{128}$ | $g^{256}$ | — |

(58) Field of Classification Search
USPC .............................................................. 380/30
See application file for complete search history.

(56) References Cited

U.S. PATENT DOCUMENTS

| | | | | |
|---|---|---|---|---|
| 11,296,861 | B1 * | 4/2022 | Zhang | H04L 9/3033 |
| 2016/0352710 | A1 * | 12/2016 | Hibshoosh | H04L 63/061 |
| 2018/0224882 | A1 | 8/2018 | Carr | |
| 2020/0374103 | A1 | 11/2020 | Cheon | |

FOREIGN PATENT DOCUMENTS

| | | | |
|---|---|---|---|
| CN | 114172651 | A | 3/2022 |
| CN | 114584284 | A | 6/2022 |

OTHER PUBLICATIONS

"IP Office of Singapore: Search Report and Written Opinion" regarding Application No. 11202407241V, Mailed on 1 Mar. 1, 2026. pp. 1-11.

* cited by examiner

14.76 Algorithm Right-to-left binary exponentiation

INPUT: an element $g \in G$ and integer $e \geq 1$.
OUTPUT: $g^e$.

1. $A \leftarrow 1$, $S \leftarrow g$.
2. While $e \neq 0$ do the following:
   2.1 If $e$ is odd then $A \leftarrow A \cdot S$.
   2.2 $e \leftarrow \lfloor e/2 \rfloor$.
   2.3 If $e \neq 0$ then $S \leftarrow S \cdot S$.
3. Return($A$).

14.77 Example (*right-to-left binary exponentiation*) The following table displays the values of $A$, $e$, and $S$ during each iteration of Algorithm 14.76 for computing $g^{283}$. □

| | | | | | | | | | | |
|---|---|---|---|---|---|---|---|---|---|---|
| $A$ | 1 | $g$ | $g^3$ | $g^3$ | $g^{11}$ | $g^{27}$ | $g^{27}$ | $g^{27}$ | $g^{27}$ | $g^{283}$ |
| $e$ | 283 | 141 | 70 | 35 | 17 | 8 | 4 | 2 | 1 | 0 |
| $S$ | $g$ | $g^2$ | $g^4$ | $g^8$ | $g^{16}$ | $g^{32}$ | $g^{64}$ | $g^{128}$ | $g^{256}$ | — |

FIG. 1

HOMOMORPHIC ENCRYPTION OPERATION METHOD AND APPARATUS, AND ELECTRONIC DEVICE

CROSS-RELATED APPLICATIONS

This specification is a national stage entry of international application no. PCT/CN2023/087309, filed Apr. 10, 2023, which claims priority to Chinese Patent Application No. 202210397418.5, filed with the China National Intellectual Property Administration on Apr. 15, 2022, which is incorporated herein by reference in its entirety.

TECHNICAL FIELD

Embodiments of this specification relate to the field of Internet technologies, and in particular, to a homomorphic encryption operation method and apparatus, and an electronic device.

BACKGROUND

Institutions usually have service requirements of joint marketing and/or joint risk control. A conventional solution is to gather data of all institutions and then perform a centralized modeling task. However, as various privacy preserving acts are introduced, cross-institution data transaction and flow are prohibited. How to complete joint computing and/or joint modeling tasks while user privacy data are preserved has become a research hotspot in academia and industry.

In many privacy preserving technologies, homomorphic encryption is a relatively widely applied technology. The homomorphic encryption technology allows the institutions to perform an operation on a ciphertext, and is a widely applied technology. However, homomorphic encryption has a disadvantage, that is, a very low computing speed. Consequently, it needs to take a dozens of hours to complete a typical data modeling task.

In view of this, a solution needs to be provided, to improve the computing speed of homomorphic encryption.

SUMMARY

Embodiments of this specification provide a homomorphic encryption operation method and apparatus, and an electronic device, to reduce an exponentiation operation time and improve a computing speed of homomorphic encryption.

According to a first aspect, an embodiment of this specification provides a homomorphic encryption operation method, applied to an electronic device participating in a homomorphic encryption operation. The method includes: determining a homomorphic encryption operation to be performed on specified service data, where the homomorphic encryption operation is used to provide privacy preserving for the service data; obtaining a base parameter and an exponent parameter that are of an exponentiation operation included in the homomorphic encryption operation; querying an exponentiation operation result cache table corresponding to the base parameter based on the exponent parameter, to obtain a result of the exponentiation operation; and completing the homomorphic encryption operation based on the result of the exponentiation operation.

In the above-mentioned homomorphic encryption operation method, after the homomorphic encryption operation to be performed on the specified service data is determined, the base parameter and the exponent parameter that are of the exponentiation operation included in the homomorphic encryption operation are obtained, the exponentiation operation result cache table corresponding to the base parameter is queried based on the exponent parameter, to obtain the result of the exponentiation operation, and finally, the homomorphic encryption operation is completed based on the result of the exponentiation operation. In this way, based on the exponentiation operation result cache table, a quantity of computing times of multiplication in the exponentiation operation can be greatly reduced, and a time required for the exponentiation operation can be greatly reduced, to improve performance of homomorphic encryption.

In a possible implementation, obtaining a base parameter of an exponentiation operation included in the homomorphic encryption operation includes: obtaining a public key used in the homomorphic encryption operation; and obtaining, from the public key, the base parameter of the exponentiation operation included in the homomorphic encryption operation.

In a possible implementation, querying an exponentiation operation result cache table corresponding to the base parameter based on the exponent parameter, to obtain a result of the exponentiation operation includes: obtaining an exponent parameter in a current operation cycle and a quantity of query rows in the exponentiation operation result cache table in the current operation cycle, and obtaining a quantity of exponentiation operation results included in each row in the exponentiation operation result cache table; when the obtained exponent parameter is unequal to a first value, upon determining that a result of performing an AND operation on the obtained exponent parameter and the quantity of the exponentiation operation results is greater than the first value, querying the exponentiation operation result cache table based on the quantity of query rows and the result of the AND operation; and multiplying an exponentiation operation result obtained through querying and an exponentiation operation result of a previous operation cycle, and using a product as an exponentiation operation result of the current operation cycle.

In a possible implementation, after obtaining an exponent parameter in a current operation cycle, the method further includes: exiting the current operation cycle when the obtained exponent parameter is equal to the first value; and using the exponentiation operation result of the previous operation cycle as a final exponentiation operation result.

In a possible implementation, after multiplying an exponentiation operation result obtained through querying and an exponentiation operation result of a previous operation cycle, and using a product as an exponentiation operation result of the current operation cycle, the method further includes: using a quotient of the exponent parameter in the current operation cycle and a width of the exponentiation operation result cache table as an exponent parameter in a next operation cycle, and increasing the quantity of query rows by a predetermined step.

In a possible implementation, querying the exponentiation operation result cache table based on the quantity of query rows and the result of the AND operation includes: obtaining a difference obtained by subtracting the result of the AND operation by a second value; and querying the exponentiation operation result cache table based on a row corresponding to the quantity of query rows and a column corresponding to the difference, to obtain an exponentiation operation result.

In a possible implementation, before querying an exponentiation operation result cache table corresponding to the base parameter based on the exponent parameter, to obtain a result of the exponentiation operation, the method further includes: generating the exponentiation operation result cache table corresponding to the base parameter based on the base parameter of the exponentiation operation included in the homomorphic encryption operation and a predetermined width.

According to a second aspect, an embodiment of this specification provides a homomorphic encryption operation apparatus. The homomorphic encryption operation apparatus is disposed in an electronic device participating in a homomorphic encryption operation, and the apparatus includes: a determining module, configured to determine a homomorphic encryption operation to be performed on specified service data, where the homomorphic encryption operation is used to provide privacy preserving for the service data; an obtaining module, configured to obtain a base parameter and an exponent parameter that are of an exponentiation operation included in the homomorphic encryption operation; a querying module, configured to query an exponentiation operation result cache table corresponding to the base parameter based on the exponent parameter, to obtain a result of the exponentiation operation; and an encryption module, configured to complete the homomorphic encryption operation based on the result of the exponentiation operation.

In a possible implementation, the obtaining module is specifically configured to: obtain a public key used in the homomorphic encryption operation; and obtain, from the public key, the base parameter of the exponentiation operation included in the homomorphic encryption operation.

In a possible implementation, the querying module includes: a parameter obtaining submodule, configured to: obtain an exponent parameter in a current operation cycle and a quantity of query rows in the exponentiation operation result cache table in the current operation cycle, and obtain a quantity of exponentiation operation results included in each row in the exponentiation operation result cache table; a result query submodule, configured to: when the exponent parameter obtained by the parameter obtaining submodule is unequal to a first value, upon determining that a result of performing an AND operation on the exponent parameter obtained by the parameter obtaining submodule and the quantity of the exponentiation operation results is greater than the first value, query the exponentiation operation result cache table based on the quantity of query rows and the result of the AND operation; and a computing submodule, configured to: multiply an exponentiation operation result obtained through querying by the result query submodule and an exponentiation operation result of a previous operation cycle, and use a product as an exponentiation operation result of the current operation cycle.

In a possible implementation, the computing submodule is further configured to: after the parameter obtaining submodule obtains the exponent parameter in the current operation cycle, exit the current operation cycle when the exponent parameter obtained by the parameter obtaining submodule is equal to the first value; and use the exponentiation operation result of the previous operation cycle as a final exponentiation operation result.

In a possible implementation, the querying module further includes: a parameter setting submodule, configured to: after the computing submodule multiplies the exponentiation operation result obtained through querying and the exponentiation operation result of the previous operation cycle, and uses the product as the exponentiation operation result of the current operation cycle, use a quotient of the exponent parameter in the current operation cycle and a width of the exponentiation operation result cache table as an exponent parameter in a next operation cycle, and increase the quantity of query rows by a predetermined step.

In a possible implementation, the result query submodule is specifically configured to: obtain a difference obtained by subtracting the result of the AND operation by a second value; and query the exponentiation operation result cache table based on a row corresponding to the quantity of query rows and a column corresponding to the difference, to obtain an exponentiation operation result.

In a possible implementation, the apparatus further includes: a generation module, configured to: before the querying module queries the exponentiation operation result cache table corresponding to the base parameter based on the exponent parameter, to obtain the result of the exponentiation operation, generate the exponentiation operation result cache table corresponding to the base parameter based on the base parameter of the exponentiation operation included in the homomorphic encryption operation and a predetermined width.

According to a third aspect, an embodiment of this specification provides an electronic device, including: at least one processor; and at least one memory communicatively connected to the processor. The memory stores program instructions capable of being executed by the processor, and the processor causes the program instructions to perform the method provided in the first aspect.

According to a fourth aspect, an embodiment of this specification provides a non-transitory computer-readable storage medium. The non-transitory computer-readable storage medium stores computer instructions, and the computer instructions enable a computer to perform the method provided in the first aspect.

It should be understood that the second aspect to the fourth aspect of the embodiments of this specification are consistent with the technical solutions in the first aspect of the embodiments of this specification. Beneficial effects achieved in the aspects and corresponding feasible implementations are similar, and details are omitted here for simplicity.

BRIEF DESCRIPTION OF DRAWINGS

To describe the technical solutions in the embodiments of this specification more clearly, the following briefly describes the accompanying drawings needed for the embodiments. Clearly, the accompanying drawings in the following descriptions show merely some embodiments of this specification, and a person of ordinary skill in the art can still derive other drawings from these accompanying drawings without creative efforts.

FIG. 1 is a schematic diagram illustrating an exponentiation operation algorithm, according to an existing related technology;

DESCRIPTION OF EMBODIMENTS

Figure 2:
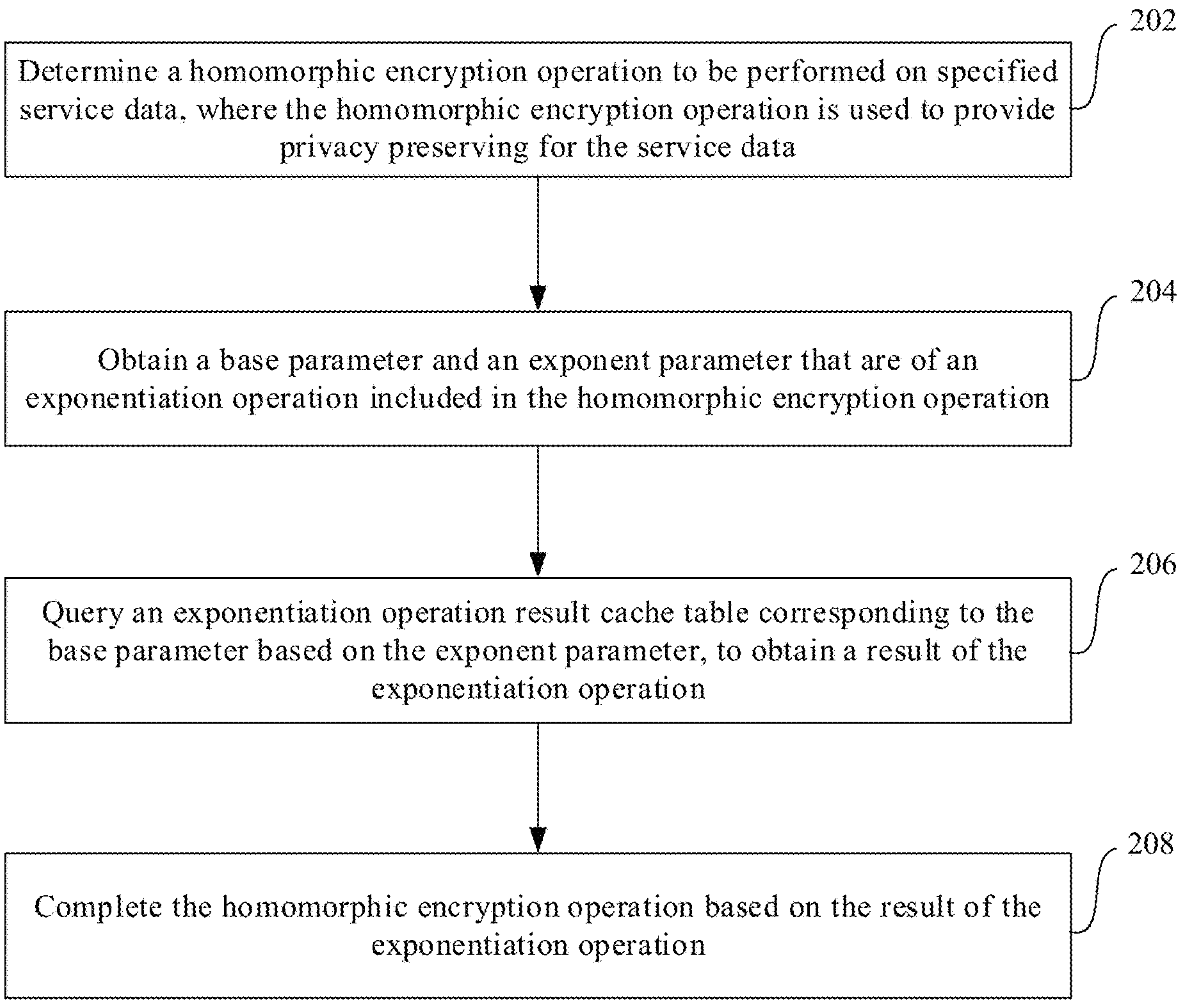
FIG. 2 is a flowchart illustrating a homomorphic encryption operation method, according to an embodiment of this specification.

To better understand the technical solutions in this specification, the following describes the embodiments of this specification in detail with reference to the accompanying drawings.

It should be noted that the described embodiments are merely some but not all of the embodiments of this specification. All other embodiments obtained by a person of ordinary skill in the art based on the embodiments of this specification without creative efforts shall fall within the protection scope of this specification.

The terms used in the embodiments of this specification are merely for describing specific embodiments, and are not intended to limit this specification. The terms "a", "said", and "the" of singular forms used in the embodiments of this specification and the appended claims are also intended to include plural forms, unless otherwise specified in the context clearly.

Homomorphic encryption is an encryption form, and allows a person to perform an algebraic operation in a specific form on a ciphertext, to still obtain an encrypted result. A result obtained by decrypting the encrypted result is the same as a result obtained by performing the same operation on a plaintext. In other words, such a technology allows the person to perform algebraic computing on encrypted data and obtain a correct result, without a need to decrypt the data throughout a processing process. Homomorphic encryption includes fully homomorphic encryption and semi-homomorphic encryption:

(1) Fully homomorphic encryption is a homomorphic encryption algorithm that supports to perform both addition and multiplication on a ciphertext. Such an algorithm satisfies all of the following: Enc(a)+Enc(b)=Enc(a+b) and Enc(a)*Enc(b)=Enc(a*b).

(2) Semi-homomorphic encryption is a homomorphic encryption algorithm that supports to perform only one operation on a ciphertext. For example, a paillier algorithm and an Okamoto-Uchiyama (OU) algorithm are additively homomorphic algorithms, and satisfy Enc(a)+Enc(b)=Enc(a+b). RSA is a multiplication homomorphic encryption algorithm, and satisfies Enc(a)*Enc(b)=Enc(a*b). Such algorithms support only one type of homomorphic computing, and are collectively referred to as a semi-homomorphic encryption algorithm.

Homomorphic encryption is a relatively novel cryptography technology. Homomorphic encryption allows the person to perform the algebraic operation in the specific form on the ciphertext, to still obtain the encrypted result. The result obtained by decrypting the encrypted result is the same as the result obtained by performing the same operation on the plaintext. For example, an institution A has data a, and an institution B has data b. The institution A can perform homomorphic encryption on all the data a, to obtain Enc(a), and then, the institution A sends the ciphertext Enc(a) to the institution B. The institution B directly computes Enc(a)+b=Enc(a+b) in the ciphertext. A computing result obtained by the institution B is still a ciphertext. Therefore, the institution B cannot perceive the original data a of the institution A. Finally, the institution B sends the computing result Enc(a+b) to the institution A. The institution A performs decryption based on a private key, to obtain a final computing result a+b. In this process, the institution A and the institution B cannot infer data of each other, but obtain the computing result, so that data are "available but invisible", to well satisfy a service requirement. (It is worthwhile to note that in the above-mentioned addition example, the institution A can infer b based on a summation result, but if the institution B performs a more complex operation, the institution A cannot infer data of the institution B.)

Although homomorphic encryption has good cryptographic characteristics, a disadvantage is very clear. To be specific, computing is very slow. Ciphertext computing is approximately 5000 times slower than plaintext computing, so that homomorphic encryption loses many practical values and can only be applied to some very simple computing scenarios.

A reason for slow homomorphic encryption is that $g^m$ needs to be computed frequently. In an existing related technology, an exponentiation operation is to dichotomize m, and then compute $g^m$. A common exponentiation operation algorithm can be shown in FIG. 1. FIG. 1 is a schematic diagram illustrating an exponentiation operation algorithm, according to an existing related technology.

For example, $g^{283}$ is computed. A total of nine times of multiplication are performed for A*=S in Line 2.1, and a total of eight times of multiplication are performed for S*=S in Line 2.3. A total of 17 times of multiplication are performed for both, and a computing speed is relatively slow.

To resolve the above-mentioned problem, the embodiments of this specification provide a homomorphic encryption operation method, to greatly improve performance of a homomorphic encryption algorithm. A test of a paillier algorithm and an OU algorithm shows that compared with original algorithm performance before the method is used, the algorithm performance is greatly improved after the homomorphic encryption operation method provided in the embodiments of this specification is used.

The homomorphic encryption operation method provided in the embodiments of this specification is applicable to the OU algorithm and the paillier algorithm. Both the OU algorithm and the paillier algorithm are relatively popular homomorphic encryption algorithms in the industry, and have similar core computing processes. Therefore, the homomorphic encryption operation method provided in the embodiments of this specification can be used for both the OU algorithm and the paillier algorithm. In the embodiments of this specification, the OU algorithm is used as an example for description. Main operations of the OU algorithm include encryption, decryption, ciphertext+ciphertext, ciphertext+plaintext, ciphertext*plaintext. The method provided in the embodiments of this specification greatly accelerates an encryption operation and a "ciphertext+plaintext" operation. The method and a principle are described as follows:

(1) Original Algorithm (1) Keys of the OU algorithm include a public key and a private key, and a key generation algorithm of the OU algorithm is as follows:

Step 1: Generate two large prime numbers p and q.

Step 2: Compute $n=p^2q$.

Step 3: Randomly select g, to satisfy $g<n$ and $g^{p-1}\neq 1 \bmod p^2$.

Step 4: Compute $h=g^n \bmod n$.

In this way, the public key is (n, g, h), and the private key is (p, q).

(2) The encryption operation in the OU algorithm can be as follows:

A plaintext $m<p$ is input, and then the following steps are performed:

Step 1: Randomly select a positive integer r, to satisfy $r<n$.

Step 2: Compute $c=g^m h^r \bmod n$.

In this way, c is a ciphertext obtained by encrypting the plaintext m.

(3) The "ciphertext+plaintext" operation in the OU algorithm can be as follows:

A ciphertext $c_1=\mathrm{Enc}(m_1)$ and a plaintext $m_2$ are given, and the following steps are performed:

Step 1: Compute $c_3=c_1 g^{m_2} \bmod n$.

A decrypted $c_3$ is equal to $m_1+m_2$. It is equivalent to that a "ciphertext $c_1$+plaintext $m_2$" operation is performed.

It can be seen from the above-mentioned descriptions that both the "encryption" operation and the "ciphertext+plaintext" operation in the OU algorithm are related to an exponentiation operation $g^m$ Because g is an element in the public key, after the public key is determined, a value of g is fixed. Computing of $g^m$ can be optimized, to improve a computing speed of homomorphic encryption.

(2) Homomorphic Encryption Method Provided in the Embodiments of this Specification In a homomorphic encryption operation, a public key is public, and each participant sends a public key of the participant to another participant. It is assumed that there are two participants A and B of the homomorphic encryption operation, after A and B generate respective public and private key pairs, A and B broadcast respective public keys to each other. To be specific, A sends a public key A of A to B, and B sends a public key B of B to A.

In the above-mentioned scenario in which "a base is fixed and an exponent changes", a concept of a cache table is introduced in the embodiments of this specification. When a participant of the homomorphic encryption operation receives a public key, in the embodiments of this specification, a cache table is computed for g in the public key, and $g^m$ can be quickly computed based on the cache table.

For example, it is assumed that the base is g, and a width of the cache table is 8, the computed cache table in the embodiments of this specification can be as follows:

$g^1, g^2, g^3, g^4, g^5, g^6, g^7$ $g^8, g^{16}, g^{24}, g^{32}, g^{40}, g^{48}, g^{56}$ $g^{64}, g^{128}, g^{192}, g^{256}, \ldots$ $g^{512}, \ldots$

. . .

In a specific implementation, each participant needs to compute one cache table for each public key. That the participants include A and B is used as an example. Because A has two public keys of the public key A and the public key B, A needs to respectively compute cache tables for the public key A and the public key B.

The public key is used for the encryption operation and the ciphertext operation. For A, there are two scenarios:

(1) A encrypts data of A to B, and uses the public key A. In this process, a cache table corresponding to the public key A can be searched, to obtain a result of an exponentiation operation.

(2) A receives encrypted data sent by B, and needs to perform an operation on a ciphertext. In this case, the public key B needs to be used. In this process, a cache table corresponding to the public key B can be searched, to obtain a result of an exponentiation operation.

The cache table only needs to be computed for one time during initialization, and does not change subsequently. A width 8 of the cache table is an adjustable configuration. A larger width indicates a larger quantity of elements in the cache table, and indicates that computing is better accelerated, but more storage space is occupied. A value of the width of the cache table satisfies a requirement of N to the power of 2. In actual use, the width can be configured as 128 or 256.

For a manner in which the cache table accelerates computing, computing of $g^{283}$ is used as an example. $g^{283}=1\cdot g^3\cdot g^{24}\cdot g^{256}$, and the latter $g^3$, $g^{24}$, and $g^{256}$ are in the cache table, and can be obtained by directly searching the table. In this way, a value of $g^{283}$ can be computed only through a total of three times of multiplication. This is very fast. Compared with an existing related technology, a quantity of times of multiplication is reduced from 17 to 3, and a time required for the exponentiation operation is greatly reduced.

Usually, for any $g^m$, a method for computing the cache table can be as follows:

```
Input: g, m
Fixed Input: Table (cache table), w (width of the cache table)
Output: g^m
A = 1; row = 0; mask = w - 1
while m! = 0:
  if m & mask > 0 then
    A * = Table[row][(m & mask) - 1]
  m /= w
  row++
return A
```

According to the homomorphic encryption method provided in the embodiments of this specification, a result of $g^m$ can be quickly obtained, so that both the "encryption" operation and the "ciphertext+plaintext" operation in the OU algorithm can be completed quickly, to improve performance of the homomorphic encryption. Because the paillier algorithm is similar to the OU algorithm, the homomorphic encryption method provided in the embodiments of this specification is also applicable to the paillier algorithm.

FIG. 2 is a flowchart illustrating a homomorphic encryption operation method, according to an embodiment of this specification. The homomorphic encryption operation method can be applied to an electronic device participating in a homomorphic encryption operation. As shown in FIG. 2, the homomorphic encryption operation method can include the following steps.

Step 202: Determine a homomorphic encryption operation to be performed on specified service data, where the homomorphic encryption operation is used to provide privacy preserving for the service data.

In one or more embodiments of this specification, the service data can be data provided by a user in an application scenario such as cloud service computing, outsourcing computing, and/or federated learning. The data usually relate to privacy of the user or privacy of a client of the user. Therefore, homomorphic encryption needs to be performed for privacy preserving.

Step 204: Obtain a base parameter and an exponent parameter that are of an exponentiation operation included in the homomorphic encryption operation.

For example, it is assumed that the exponentiation operation included in the homomorphic encryption operation is $g^m$, the base parameter is g, and the exponent parameter is m.

Specifically, the obtaining a base parameter of an exponentiation operation included in the homomorphic encryption operation can be: obtaining a public key used in the homomorphic encryption operation; and obtaining, from the public key, the base parameter of the exponentiation operation included in the homomorphic encryption operation.

In the homomorphic encryption operation, the public key is public, and each participant sends a public key of the participant to another participant. The base parameter is an element in the public key. Therefore, after the public key is obtained, a participant of the homomorphic encryption operation can obtain the base parameter from the public key.

Step 206: Query an exponentiation operation result cache table corresponding to the base parameter based on the exponent parameter, to obtain a result of the exponentiation operation.

Specifically, it is assumed that the exponentiation operation result cache table is as follows:

$g^1, g^2, g^3, g^4, g^5, g^6, g^7$ $g^8, g^{16}, g^{24}, g^{32}, g^{40}, g^{48}, g^{56}$ $g^{64}, g^{128}, g^{192}, g^{256}, \ldots$ $g^{512}, \ldots$

. . .

Then, a result of $g^m$ can be obtained by querying the exponentiation operation result cache table based on a specific value of m.

Step 208: Complete the homomorphic encryption operation based on the result of the exponentiation operation.

In the above-mentioned homomorphic encryption operation method, after the homomorphic encryption operation to be performed on the specified service data is determined, the base parameter and the exponent parameter that are of the exponentiation operation included in the homomorphic encryption operation are obtained, the exponentiation operation result cache table corresponding to the base parameter is queried based on the exponent parameter, to obtain the result of the exponentiation operation, and finally, the homomorphic encryption operation is completed based on the result of the exponentiation operation. In this way, based on the exponentiation operation result cache table, a quantity of computing times of multiplication in the exponentiation operation can be greatly reduced, and a time required for the exponentiation operation can be greatly reduced, to improve performance of homomorphic encryption.

Figure 3:
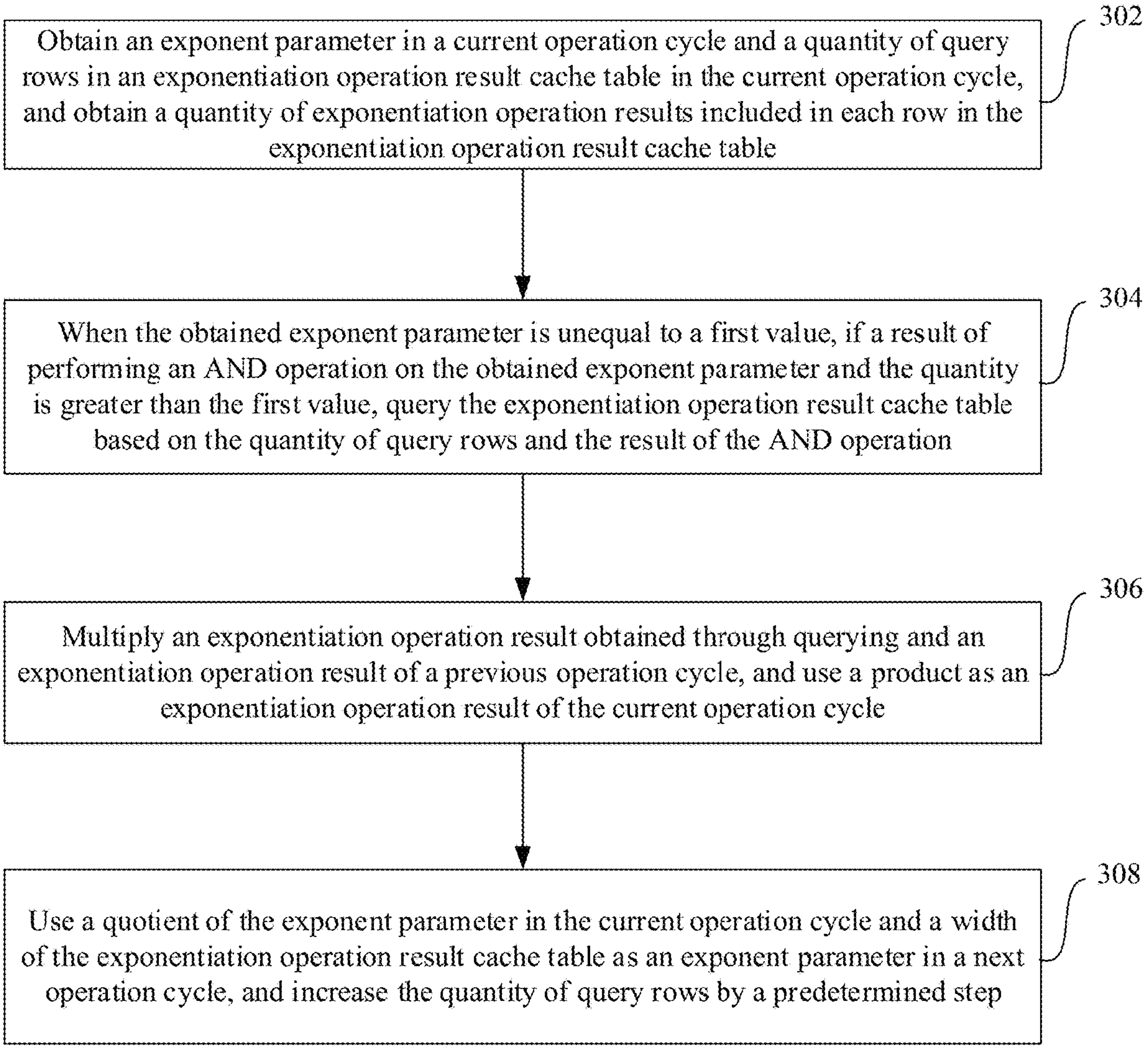
FIG. 3 is a flowchart illustrating a homomorphic encryption operation method, according to another embodiment of this specification.

FIG. 3 is a flowchart illustrating a homomorphic encryption operation method, according to another embodiment of this specification. As shown in FIG. 3, in the embodiment shown in FIG. 2 in this specification, step 206 can include the following steps.

Step 302: Obtain an exponent parameter in a current operation cycle and a quantity of query rows in the exponentiation operation result cache table in the current operation cycle, and obtain a quantity of exponentiation operation results included in each row in the exponentiation operation result cache table.

The quantity of exponentiation operation results included in each row in the exponentiation operation result cache table can be determined based on a width of the cache table, and is usually the width of the cache table minus 1. For example, when the width of the cache table is 8, the quantity can be 7.

Step 304: When the obtained exponent parameter is unequal to a first value, if a result of performing an AND operation on the obtained exponent parameter and the quantity is greater than the first value, query the exponentiation operation result cache table based on the quantity of query rows and the result of the AND operation.

In a specific implementation, the first value can be set based on system performance and/or an implementation requirement, etc. In this embodiment, the first value is not limited. For example, the first value can be 0.

Specifically, the querying the exponentiation operation result cache table based on the quantity of query rows and the result of the AND operation can be: obtaining a difference obtained by subtracting the result of the AND operation by a second value; and querying the exponentiation operation result cache table based on a row corresponding to the quantity of query rows and a column corresponding to the difference, to obtain an exponentiation operation result.

In a specific implementation, the second value can be set based on system performance and/or an implementation requirement, etc. In this embodiment, the second value is not limited. For example, the second value can be 1.

Step 306: Multiply an exponentiation operation result obtained through querying and an exponentiation operation result of a previous operation cycle, and use a product as an exponentiation operation result of the current operation cycle.

Further, after step 306, the following step can be further included:

Step 308: Use a quotient of the exponent parameter in the current operation cycle and a width of the exponentiation operation result cache table as an exponent parameter in a next operation cycle, and increase the quantity of query rows by a predetermined step.

In a specific implementation, the predetermined step can be independently set based on system performance and/or an implementation requirement, etc. In this embodiment, the predetermined step is not limited. For example, the predetermined step can be 1.

Step 302 to step 308 can be cyclically performed. In this way, in a cyclical execution process, if the exponent parameter that is in the current operation cycle and that is obtained in step 302 is equal to the first value, the current operation cycle is exited, and the exponentiation operation result of the previous operation cycle is used as a final exponentiation operation result.

Figure 4:
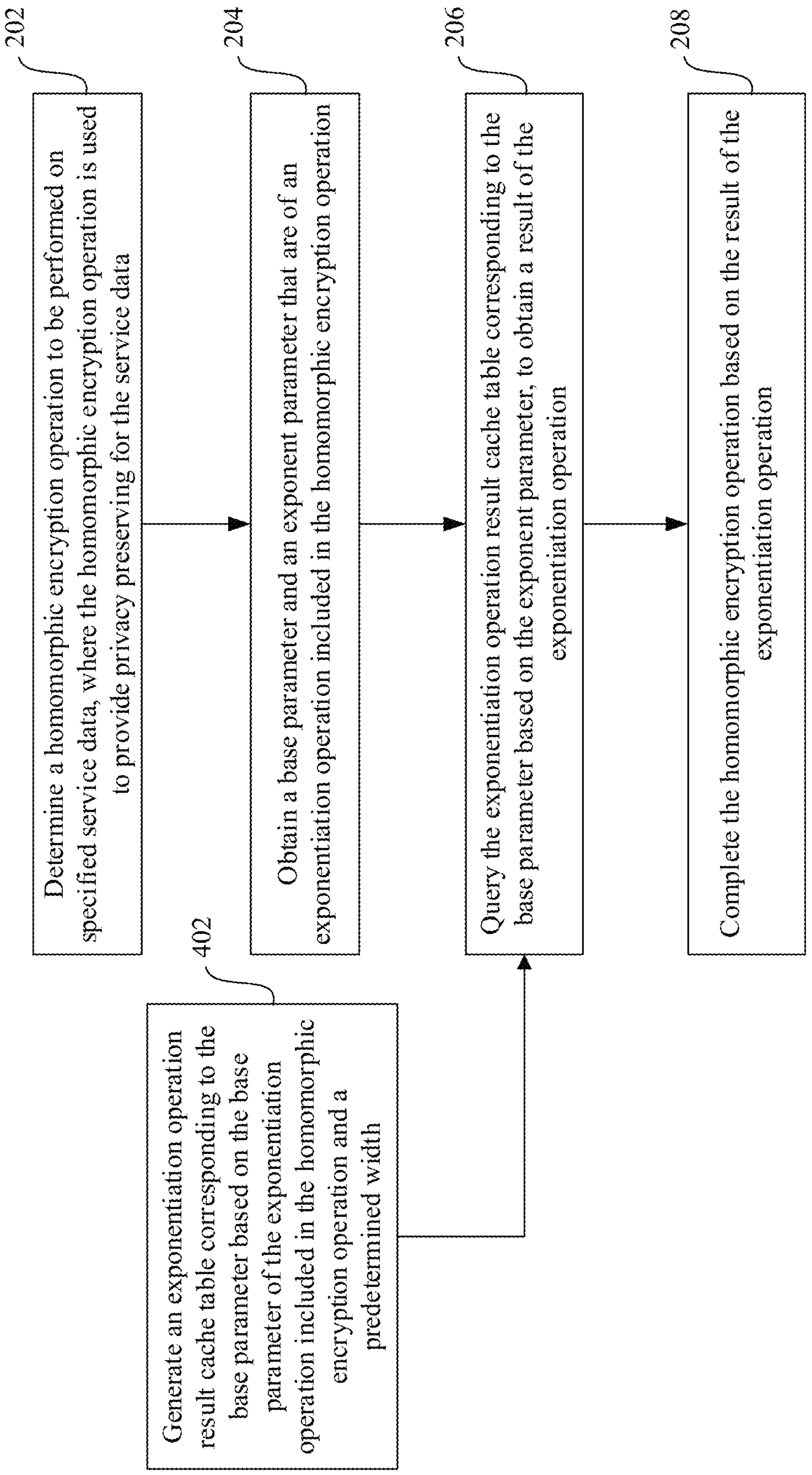
FIG. 4 is a flowchart illustrating a homomorphic encryption operation method, according to still another embodiment of this specification.

FIG. 4 is a flowchart illustrating a homomorphic encryption operation method, according to still another embodiment of this specification. As shown in FIG. 4, in the embodiment shown in FIG. 2 in this specification, before step 206, the method can further include the following step.

Step 402: Generate the exponentiation operation result cache table corresponding to the base parameter based on the base parameter of the exponentiation operation included in the homomorphic encryption operation and a predetermined width.

In a specific implementation, each participant needs to compute one cache table for each public key. That participants include A and B is used as an example. After A and B generate respective public and private key pairs, A and B broadcast respective public keys to each other. To be specific, A sends a public key A of A to B, and B sends a public key B of B to A. In this way, for A, because A has two public keys of the public key A and the public key B, A needs to respectively compute exponentiation operation result cache tables for the public key A and the public key B.

The cache table only needs to be computed for one time during initialization, and does not change subsequently. The predetermined width is the width of the cache table, and the width is an adjustable configuration. A larger width indicates a larger quantity of elements in the cache table, and indicates that computing is better accelerated, but more storage space is occupied. A value of the width of the cache table needs to satisfy a requirement of N to the power of 2. In actual use, the width can be configured as 128 or 256.

A concept of the cache table is introduced in the homomorphic encryption operation method, to greatly reduce a quantity of computing times of multiplication in the exponentiation operation, thereby greatly reducing a time required for the exponentiation operation, and greatly improving performance of homomorphic encryption, so that a homomorphic encryption technology can be applied to an actual scenario, to help popularize and implement a privacy preserving technology.

Specific embodiments of this specification are described above. Other embodiments fall within the scope of the appended claims. In some cases, actions or steps described in the claims can be performed in a sequence different from that in the embodiments and desired results can still be achieved. In addition, the process depicted in the accompanying drawings does not necessarily need a particular sequence to achieve the desired results. In some implementations, multi-tasking and parallel processing are feasible or may be advantageous.

Figure 5:
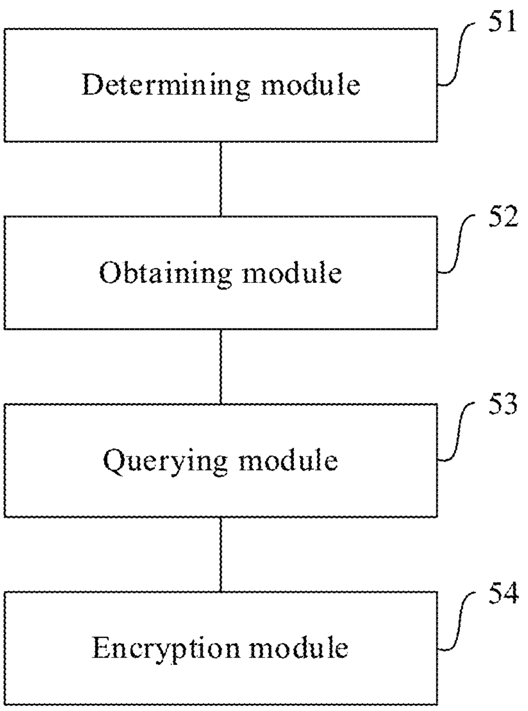
FIG. 5 is a schematic structural diagram illustrating a homomorphic encryption operation apparatus, according to an embodiment of this specification.

FIG. 5 is a schematic structural diagram illustrating a homomorphic encryption operation apparatus, according to an embodiment of this specification. The homomorphic encryption operation apparatus is disposed in an electronic device participating in a homomorphic encryption operation. As shown in FIG. 5, the homomorphic encryption operation apparatus can include a determining module 51, an obtaining module 52, a querying module 53, and an encryption module 54.

The determining module 51 is configured to determine a homomorphic encryption operation to be performed on specified service data. The homomorphic encryption operation is used to provide privacy preserving for the service data.

The obtaining module 52 is configured to obtain a base parameter and an exponent parameter that are of an exponentiation operation included in the homomorphic encryption operation.

The querying module 53 is configured to query an exponentiation operation result cache table corresponding to the base parameter based on the exponent parameter, to obtain a result of the exponentiation operation.

The encryption module 54 is configured to complete the homomorphic encryption operation based on the result of the exponentiation operation.

The homomorphic encryption operation apparatus provided in the embodiment shown in FIG. 5 can be configured to execute the technical solutions in the method embodiment shown in FIG. 2 in this specification. For implementation principles and technical effects of the homomorphic encryption operation apparatus, references can be further made to related descriptions in the method embodiment.

Figure 6:
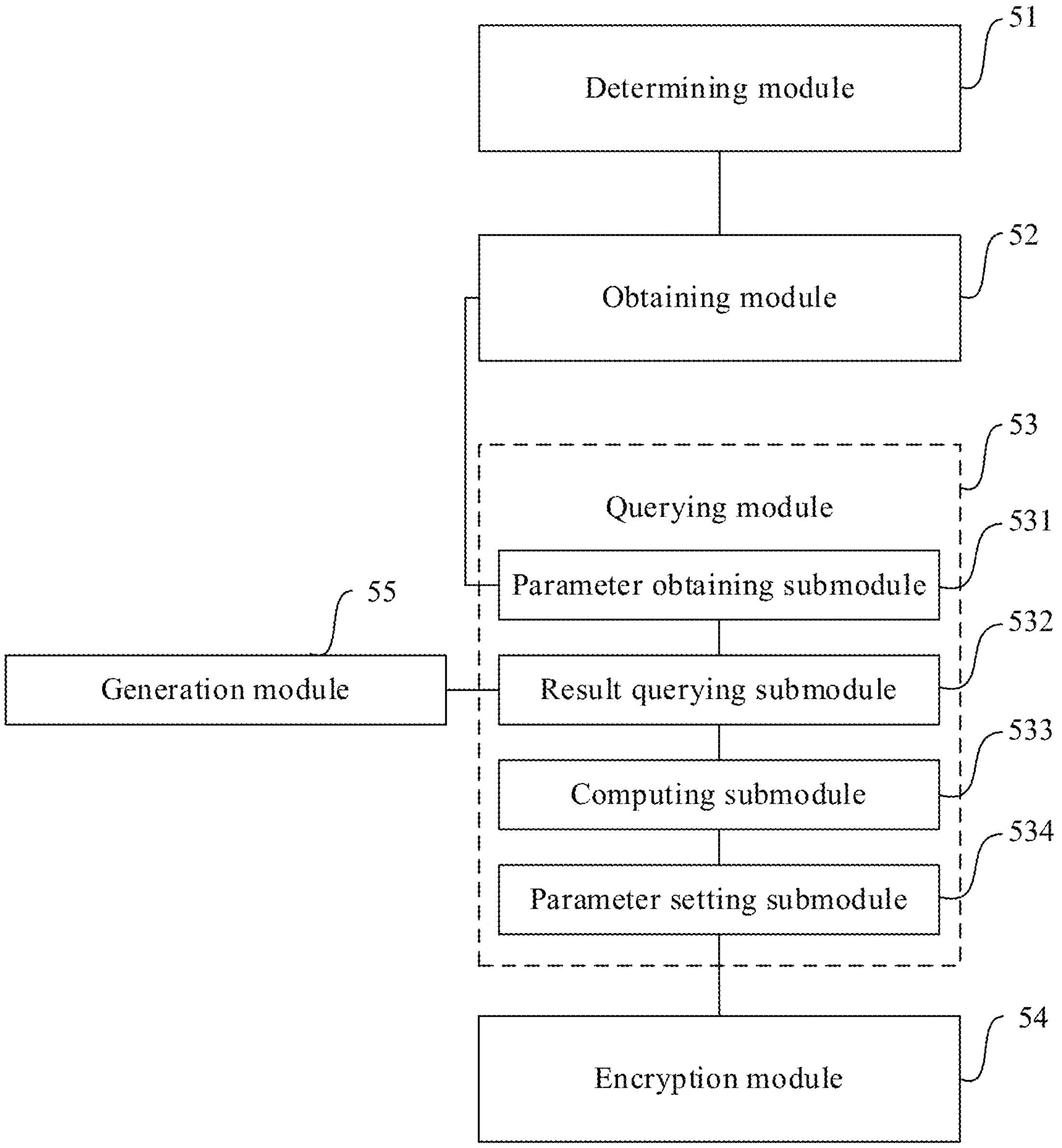
FIG. 6 is a schematic structural diagram illustrating a homomorphic encryption operation apparatus, according to another embodiment of this specification.

FIG. 6 is a schematic structural diagram illustrating a homomorphic encryption operation apparatus, according to another embodiment of this specification. Compared with the homomorphic encryption operation apparatus shown in FIG. 5, in the homomorphic encryption operation apparatus shown in FIG. 6, the obtaining module 52 is specifically configured to: obtain a public key used in the homomorphic encryption operation; and obtain, from the public key, the base parameter of the exponentiation operation included in the homomorphic encryption operation.

In this embodiment, the querying module 53 can include a parameter obtaining submodule 531, a result query submodule 532, and a computing submodule 533.

The parameter obtaining submodule 531 is configured to: obtain an exponent parameter in a current operation cycle and a quantity of query rows in the exponentiation operation result cache table in the current operation cycle, and obtain a quantity of exponentiation operation results included in each row in the exponentiation operation result cache table.

The result query submodule 532 is configured to: when the exponent parameter obtained by the parameter obtaining submodule 531 is unequal to a first value, upon determining that a result of performing an AND operation on the exponent parameter obtained by the parameter obtaining submodule 531 and the quantity of the exponentiation operation results is greater than the first value, query the exponentiation operation result cache table based on the quantity of query rows and the result of the AND operation.

The computing submodule 533 is configured to: multiply an exponentiation operation result obtained through querying by the result query submodule 532 and an exponentiation operation result of a previous operation cycle, and use a product as an exponentiation operation result of the current operation cycle.

Further, the computing submodule 533 is further configured to: after the parameter obtaining submodule 531 obtains the exponent parameter in the current operation cycle, exit the current operation cycle when the exponent parameter obtained by the parameter obtaining submodule 531 is equal to the first value; and use the exponentiation operation result of the previous operation cycle as a final exponentiation operation result.

Further, the querying module 53 can further include a parameter setting submodule 534.

The parameter setting submodule 534 is configured to: after the computing submodule 533 multiplies the exponentiation operation result obtained through querying and the exponentiation operation result of the previous operation cycle, and uses the product as the exponentiation operation result of the current operation cycle, use a quotient of the exponent parameter in the current operation cycle and a width of the exponentiation operation result cache table as an exponent parameter in a next operation cycle, and increase the quantity of query rows by a predetermined step.

In this embodiment, the result query submodule 532 is specifically configured to: obtain a difference obtained by subtracting the result of the AND operation by a second value; and query the exponentiation operation result cache table based on a row corresponding to the quantity of query rows and a column corresponding to the difference, to obtain an exponentiation operation result.

Further, the homomorphic encryption operation apparatus can further include a generation module 55.

The generation module 55 is configured to: before the querying module 53 queries the exponentiation operation result cache table corresponding to the base parameter based on the exponent parameter, to obtain the result of the exponentiation operation, generate the exponentiation operation result cache table corresponding to the base parameter based on the base parameter of the exponentiation operation included in the homomorphic encryption operation and a predetermined width.

The homomorphic encryption operation apparatus provided in the embodiment shown in FIG. 6 can be configured to execute the technical solutions in the method embodiment shown in FIG. 2 to FIG. 4 in this specification. For implementation principles and technical effects of the homomorphic encryption operation apparatus, references can be further made to related descriptions in the method embodiment.

Figure 7:
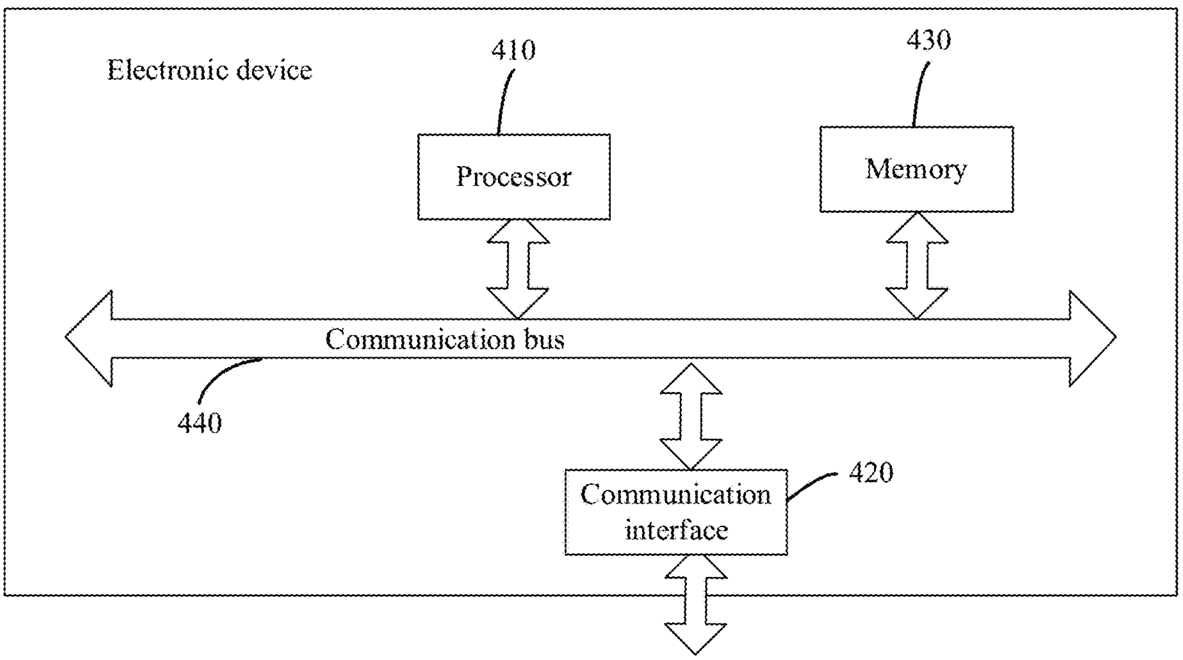
FIG. 7 is a schematic structural diagram illustrating an electronic device, according to an embodiment of this specification.

FIG. 7 is a schematic structural diagram illustrating an electronic device, according to an embodiment of this specification. As shown in FIG. 7, the electronic device can include: at least one processor; and at least one memory communicatively connected to the processor. The memory stores program instructions capable of being executed by the processor, and the processor causes the program instructions, to perform the homomorphic encryption operation method provided in the embodiment shown in FIG. 2 to FIG. 4 in this specification.

The electronic device can be a device participating in the homomorphic encryption operation. A form of the electronic device is not limited in this embodiment.

FIG. 7 is a block diagram illustrating an example electronic device applicable for implementing implementations of this specification. The electronic device shown in FIG. 7 is only an example, and should not constitute any limitation to a function and a use scope of the embodiments of this specification.

As shown in FIG. 7, the electronic device is represented as a common computing device. Components of the electronic device can include but are not limited to one or more processors 410, a communication interface 420, a memory 430, and a communication bus 440 connected to different components (including the memory 430, the communication interface 420, and a processor 410).

The communication bus 440 represents one or more of several types of bus structures, including a memory bus or a memory controller, a peripheral bus, a graphics acceleration port, or a local bus in any of a plurality of bus structures. For example, the communication bus 440 can include but is not limited to an industry standard architecture (ISA) bus, a micro channel architecture (MCA) bus, an enhanced ISA bus, a video electronics standards association (VESA) local bus, and a peripheral component interconnection (PCI) bus.

The electronic device typically includes a plurality of computer system readable media. These media can be any usable medium that can be accessed by the electronic device, including a volatile medium and a nonvolatile medium, a removable medium, and a non-removable medium.

The memory 430 can include a computer system readable medium in a form of the volatile memory, for example, a random access memory (RAM) and/or a cache memory. The memory 430 can include at least one program product, the program product includes a group of program modules (for example, at least one program module), and the program modules are configured to perform the functions in the embodiment shown in FIG. 2 to FIG. 4 in this specification.

A program/utility including a group of program modules (at least one program module) can be stored in the memory 430. The program modules include but are not limited to an operating system, one or more applications, another program module, and program data. Each or a combination of these examples may include an implementation of a network environment. The program module usually performs functions and/or the method in the embodiment described in FIG. 2 to FIG. 4 in this specification.

The processor 410 runs the program stored in the memory 430, to execute various functional applications and data processing, for example, implement the homomorphic encryption operation method provided in the embodiment shown in FIG. 2 to FIG. 4 in this specification.

An embodiment of this specification provides a non-transitory computer-readable storage medium. The non-transitory computer-readable storage medium stores computer instructions, and the computer instructions enable a computer to perform the homomorphic encryption operation method provided in the embodiment shown in FIG. 2 to FIG. 4 in this specification.

The non-transitory computer-readable storage medium can be any combination of one or more computer-readable media. The computer-readable medium can be a computer-readable signal medium or a computer-readable storage medium. The computer-readable storage medium can be but is not limited to, for example, an electrical system, apparatus, or device, a magnetic system, apparatus, or device, an optical system, apparatus, or device, an electromagnetic system, apparatus, or device, an infrared system, apparatus, or device, or a semiconductor system, apparatus, or device, or any combination thereof. More specific examples (a non-exhaustive list) of the computer-readable storage medium include: an electrical connection including one or more conducting wires, a portable computer disk, a hard disk, a random access memory (RAM), a read-only memory (ROM), an erasable programmable read-only memory (EPROM) or a flash memory, an optical fiber, a portable compact disc read-only memory (CD-ROM), an optical storage component, a magnetic storage component, or any proper combination thereof. In this document, the computer-readable storage medium can be any tangible medium that includes or stores a program, and the program can be used by or in combination with an instruction execution system, apparatus, or device.

The computer-readable signal medium can include a data signal propagated in a baseband or as part of a carrier, and carries computer-readable program code. The propagated data signal can be in a plurality of forms, and includes but is not limited to an electromagnetic signal, an optical signal, or any proper combination thereof. The computer-readable signal medium can further be any computer-readable medium other than the computer-readable storage medium, and the computer-readable medium can be used to send, propagate, or transmit a program used by or in combination with an instruction execution system, apparatus, or component.

Program code included in the computer-readable medium can be transmitted in any proper medium, including but not limited to a wireless medium, an electrical cable, an optical cable, a radio frequency (RF) medium, or any proper combination thereof.

Computer program code for performing an operation of this specification can be written in one or more program design languages or a combination thereof. The program design language includes an object-oriented program design language, for example, Java, Smalltalk, or C++, and further includes a conventional procedural program design language, for example, "C" language, or a similar program design language. The program code can be completely executed on a user computer, partially executed on a user computer, executed as an independent software package, partially executed on a user computer and partially executed on a remote computer, or completely executed on a remote computer or a server. When the remote computer is involved, the remote computer may be connected to the user computer over any type of network, including a local area network (LAN) or a wide area network (WAN), or may be connected to an external computer (for example, connected over the Internet by using an Internet service provider).

Specific embodiments of this specification are described above. Other embodiments fall within the scope of the appended claims. In some cases, actions or steps described in the claims can be performed in a sequence different from that in the embodiments and desired results can still be achieved. In addition, the process depicted in the accompanying drawings does not necessarily need a particular sequence to achieve the desired results. In some implementations, multi-tasking and parallel processing are feasible or may be advantageous.

In the descriptions of this specification, reference to the descriptions of the terms "one embodiment", "some embodiments", "example", "specific example", or "some examples" means that specific features, structures, materials, or features described in the embodiments or examples are included in at least one embodiment or example of this specification. In this specification, example descriptions of the terms do not need to be specific to the same embodiment or example. In addition, the described specific features, structures, materials, or characteristics can be combined in a proper manner in any one or more embodiments or examples. In addition, without mutual contradictoriness, a person skilled in the art can integrate or combine different embodiments or examples described in this specification and features of different embodiments or examples.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include at least one of such features. In the descriptions of this specification, "a plurality of" means at least two, for example, two or three, unless otherwise clearly limited.

Any process or method description described in the flowchart or in another manner here can be understood as representing a module, segment, or part of code that includes one or more executable instructions for implementing steps of a customized logical function or process, and a range of a preferred implementation of this specification includes another implementation in a sequence not shown or discussed, including performing a function in a substantially simultaneous manner or in an opposite sequence based on an involved function. This should be understood by a person skilled in the art of the embodiments of this specification.

Depending on the context, for example, the word "if" used here can be interpreted as "while", "when", "in response to determining", or "in response to detecting". Similarly, depending on the context, the phrase "if determining . . . " or "if detecting (the condition or event stated)" can be explained as "when determining . . . ", "in response to determining . . . ", "when detecting (the condition or event stated)", or "in response to detecting (the condition or event stated)".

It should be noted that a terminal used in the embodiments of this specification can include but is not limited to a personal computer (PC), a personal digital assistant (PDA), a wireless handheld device, a tablet computer, a mobile phone, an MP3 player, or an MP4 player.

In the several embodiments provided in this specification, it should be understood that the SPECIFICATION system, apparatus, and method can be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this specification can be integrated into one processing unit, each of the units can exist alone physically, or two or more units are integrated into one unit. The integrated unit may be implemented in a form of hardware, or may be implemented in a form of hardware in addition to a software functional unit.

The integrated unit implemented in a form of a software functional unit can be stored in a computer-readable storage medium. The software functional unit is stored in a storage medium, and includes several instructions for enabling a computer apparatus (which can be a personal computer, a server, or a network apparatus) or a processor to perform some steps of the method described in the embodiments of this specification. The above-mentioned storage medium includes any medium that can store program code, for example, a USB flash drive, a removable hard disk, a read-only memory (ROM), a random access memory (RAM), a magnetic disk, or an optical disc.

The above-mentioned descriptions are merely example embodiments of this specification, but are not intended to limit this specification. Any modification, equivalent replacement, improvement, etc. made without departing from the spirit and principle of this specification shall fall within the protection scope of this specification.

The invention claimed is:

1. A homomorphic encryption operation method, applied to an electronic device participating in a homomorphic encryption operation, wherein the method comprises:

determining a homomorphic encryption operation to be performed on specified service data, wherein the homomorphic encryption operation is used to provide privacy preserving for the service data;

obtaining a base parameter and an exponent parameter that are of an exponentiation operation comprised in the homomorphic encryption operation;

querying an exponentiation operation result cache table corresponding to the base parameter based on the exponent parameter, to obtain a result of the exponentiation operation; and completing the homomorphic encryption operation based on the result of the exponentiation operation, wherein querying an exponentiation operation result cache table corresponding to the base parameter based on the exponent parameter, to obtain a result of the exponentiation operation comprises:

obtaining an exponent parameter in a current operation cycle and a quantity of query rows in the exponentiation operation result cache table in the current operation cycle, and obtaining a quantity of exponentiation operation results comprised in each row in the exponentiation operation result cache table;

when the obtained exponent parameter is unequal to a first value, upon determining that a result of performing an AND operation on the obtained exponent parameter and the quantity of the exponentiation operation results is greater than the first value, querying the exponentiation operation result cache table based on the quantity of query rows and the result of the AND operation; and multiplying an exponentiation operation result obtained through querying and an exponentiation operation result of a previous operation cycle, and using a product as an exponentiation operation result of the current operation cycle.

2. The method according to claim 1, wherein obtaining a base parameter of an exponentiation operation comprised in the homomorphic encryption operation comprises:

obtaining a public key used in the homomorphic encryption operation; and obtaining, from the public key, the base parameter of the exponentiation operation comprised in the homomorphic encryption operation.

3. The method according to claim 1, wherein after obtaining an exponent parameter in a current operation cycle, the method further comprises:

exiting the current operation cycle when the obtained exponent parameter is equal to the first value; and using the exponentiation operation result of the previous operation cycle as a final exponentiation operation result.

4. The method according to claim 1, wherein after multiplying an exponentiation operation result obtained through querying and an exponentiation operation result of a previous operation cycle, and using a product as an exponentiation operation result of the current operation cycle, the method further comprises:

using a quotient of the exponent parameter in the current operation cycle and a width of the exponentiation operation result cache table as an exponent parameter in a next operation cycle; and increasing the quantity of query rows by a predetermined step.

5. The method according to claim 1, wherein querying the exponentiation operation result cache table based on the quantity of query rows and the result of the AND operation comprises:

obtaining a difference obtained by subtracting the result of the AND operation by a second value; and querying the exponentiation operation result cache table based on a row corresponding to the quantity of query rows and a column corresponding to the difference, to obtain an exponentiation operation result.

6. The method according to claim 1, wherein before querying an exponentiation operation result cache table corresponding to the base parameter based on the exponent parameter, to obtain a result of the exponentiation operation, the method further comprises:

generating the exponentiation operation result cache table corresponding to the base parameter based on the base parameter of the exponentiation operation comprised in the homomorphic encryption operation and a predetermined width.

7. An electronic device comprising a memory and a processor, wherein the memory stores executable instructions that, in response to execution by the processor, cause the electronic device to:

determine a homomorphic encryption operation to be performed on specified service data, wherein the homomorphic encryption operation is used to provide privacy preserving for the service data;

obtain a base parameter and an exponent parameter that are of an exponentiation operation comprised in the homomorphic encryption operation;

query an exponentiation operation result cache table corresponding to the base parameter based on the exponent parameter, to obtain a result of the exponentiation operation; and complete the homomorphic encryption operation based on the result of the exponentiation operation;

wherein the electronic device being caused to query an exponentiation operation result cache table corresponding to the base parameter based on the exponent parameter, to obtain a result of the exponentiation operation includes being caused to:

obtain an exponent parameter in a current operation cycle and a quantity of query rows in the exponentiation operation result cache table in the current operation cycle, and obtain a quantity of exponentiation operation results comprised in each row in the exponentiation operation result cache table;

when the obtained exponent parameter is unequal to a first value, upon determining that a result of performing an AND operation on the obtained exponent parameter and the quantity of the exponentiation operation results is greater than the first value, query the exponentiation operation result cache table based on the quantity of query rows and the result of the AND operation; and multiply an exponentiation operation result obtained through querying and an exponentiation operation result of a previous operation cycle, and use a product as an exponentiation operation result of the current operation cycle.

8. The electronic device according to claim 7, wherein the electronic device being caused to obtain a base parameter of an exponentiation operation comprised in the homomorphic encryption operation includes being caused to:

obtain a public key used in the homomorphic encryption operation; and obtain, from the public key, the base parameter of the exponentiation operation comprised in the homomorphic encryption operation.

9. The electronic device according to claim 7, wherein the electronic device is further caused to:

exit the current operation cycle when the obtained exponent parameter is equal to the first value; and use the exponentiation operation result of the previous operation cycle as a final exponentiation operation result.

10. The electronic device according to claim 7, wherein the electronic device is further caused to:

use a quotient of the exponent parameter in the current operation cycle and a width of the exponentiation operation result cache table as an exponent parameter in a next operation cycle; and increase the quantity of query rows by a predetermined step.

11. The electronic device according to claim 7, wherein the electronic device being caused to query the exponentiation operation result cache table based on the quantity of query rows and the result of the AND operation includes being caused to:

obtain a difference obtained by subtracting the result of the AND operation by a second value; and query the exponentiation operation result cache table based on a row corresponding to the quantity of query rows and a column corresponding to the difference, to obtain an exponentiation operation result.

12. The electronic device according to claim 7, wherein the electronic device is further caused to:

generate the exponentiation operation result cache table corresponding to the base parameter based on the base parameter of the exponentiation operation comprised in the homomorphic encryption operation and a predetermined width.

13. A non-transitory computer-readable storage medium comprising instructions stored therein that, when executed by a processor of an electronic device, cause the electronic device to:

determine a homomorphic encryption operation to be performed on specified service data, wherein the homomorphic encryption operation is used to provide privacy preserving for the service data;

obtain a base parameter and an exponent parameter that are of an exponentiation operation comprised in the homomorphic encryption operation;

query an exponentiation operation result cache table corresponding to the base parameter based on the exponent parameter, to obtain a result of the exponentiation operation; and complete the homomorphic encryption operation based on the result of the exponentiation operation, wherein the electronic device being caused to query an exponentiation operation result cache table corresponding to the base parameter based on the exponent parameter, to obtain a result of the exponentiation operation includes being caused to:

obtain an exponent parameter in a current operation cycle and a quantity of query rows in the exponentiation operation result cache table in the current operation cycle, and obtain a quantity of exponentiation operation results comprised in each row in the exponentiation operation result cache table;

when the obtained exponent parameter is unequal to a first value, upon determining that a result of performing an AND operation on the obtained exponent parameter and the quantity of the exponentiation operation results is greater than the first value, query the exponentiation operation result cache table based on the quantity of query rows and the result of the AND operation; and multiply an exponentiation operation result obtained through querying and an exponentiation operation result of a previous operation cycle, and use a product as an exponentiation operation result of the current operation cycle.

14. The non-transitory computer-readable storage medium according to claim 13, wherein the electronic device being caused to obtain a base parameter of an exponentiation operation comprised in the homomorphic encryption operation includes being caused to:

obtain a public key used in the homomorphic encryption operation; and obtain, from the public key, the base parameter of the exponentiation operation comprised in the homomorphic encryption operation.

15. The non-transitory computer-readable storage medium according to claim 13, wherein the electronic device is further caused to:

exit the current operation cycle when the obtained exponent parameter is equal to the first value; and use the exponentiation operation result of the previous operation cycle as a final exponentiation operation result.

16. The non-transitory computer-readable storage medium according to claim 13, wherein the electronic device is further caused to:

use a quotient of the exponent parameter in the current operation cycle and a width of the exponentiation operation result cache table as an exponent parameter in a next operation cycle; and increase the quantity of query rows by a predetermined step.

17. The non-transitory computer-readable storage medium according to claim 13, wherein the electronic device being caused to query the exponentiation operation result cache table based on the quantity of query rows and the result of the AND operation includes being caused to:

obtain a difference obtained by subtracting the result of the AND operation by a second value; and query the exponentiation operation result cache table based on a row corresponding to the quantity of query rows and a column corresponding to the difference, to obtain an exponentiation operation result.

* * * * *